INVENTORS
LAWRENCE C. GEORGE
LEE N. BALLARD
VERNON H. FEELER

United States Patent Office 3,736,239
Patented May 29, 1973

3,736,239
NEUTRALIZATION OF METAL CONTAINING WASTES
Lawrence C. George and Lee N. Ballard, Rolla, and Vernon H. Feeler, Vienna, Mo., assignors to the United States of America as represented by the Secretary of the Interior
Filed Mar. 18, 1971, Ser. No. 125,573
Int. Cl. C22d 1/16; C01c 3/08
U.S. Cl. 204—108                                10 Claims

ABSTRACT OF THE DISCLOSURE

A cyanide and metal-containing liquid waste stream is treated by addition of a second liquid waste stream which contains acids and dissolved metals. Free cyanide ions are quantitatively removed from the wastes by precipitation as metal cyanides at neutral to slightly acid conditions.

BACKGROUND OF THE INVENTION

Substantial quantities of alkaline cyanide wastes are generated by the electroplating industry. These wastes will typically contain relatively high concentrations of metals, such as copper, nickel, and silver, in solution as well as cyanide ion. Since cyanides are highly toxic to mammals and to most aquatic animals, it is necessary to destroy essentially all of the cyanide content of plating wastes before disposal into sewers or surface waters.

Probably the most common method of cyanide-waste treatment is by alkali-chlorination. In this process, cyanide is first oxidized by chlorine to the cyanate and then is either further oxidized, again using chlorine, to carbon dioxide and nitrogen or the cyanate is hydrolyzed to yield the same products using an acid such as sulfuric. This is a relatively costly process and does not directly result in recovery of the metals contained in the waste stream.

Electrolytic oxidation of relatively concentrated cyanide wastes is also possible and is commercially practiced. Electrolytic decomposition processes destroy the cyanide without formation of other toxic compounds and additionally recover much of the metal content as a cathode deposit. This technique, however, is not practical for use in the treatment of dilute solutions such as rinse waters.

In another approach, cyanides contained in waste streams are precipitated to form insoluble metal cyanides. This is illustrated by the Zabban patent, U.S. 2,845,330. Zabban uses a mixture of copper sulfate and sodium sulfite to precipitate insoluble metallic cyanides from waste streams. The principal disadvantage to this method is that it requires special and rather expensive reagents to destroy the cyanides and precipitate the metals.

SUMMARY OF THE INVENTION

Many electroplating plants generate both acidic, metal-ion containing wastes and alkaline, cyanide containing wastes. Careful addition of the acidic waste stream to the alkaline cyanide waste stream precipitates insoluble metal cyanides and neutralizes the acid without detectable generation of hydrogen cyanide. Filtrate recovered from the treatment step is relatively harmless compared to the original waste streams and meets water quality standards for free cyanide ion content.

Hence, it is an object of this invention to neutralize electroplating and metal treatment wastes.

It is another object of this invention to utilize one waste stream to treat a second waste.

Yet another object of this invention is to recover metallic components contained in plating wastes.

DETAILED DESCRIPTION OF THE INVENTION

Figure 1:
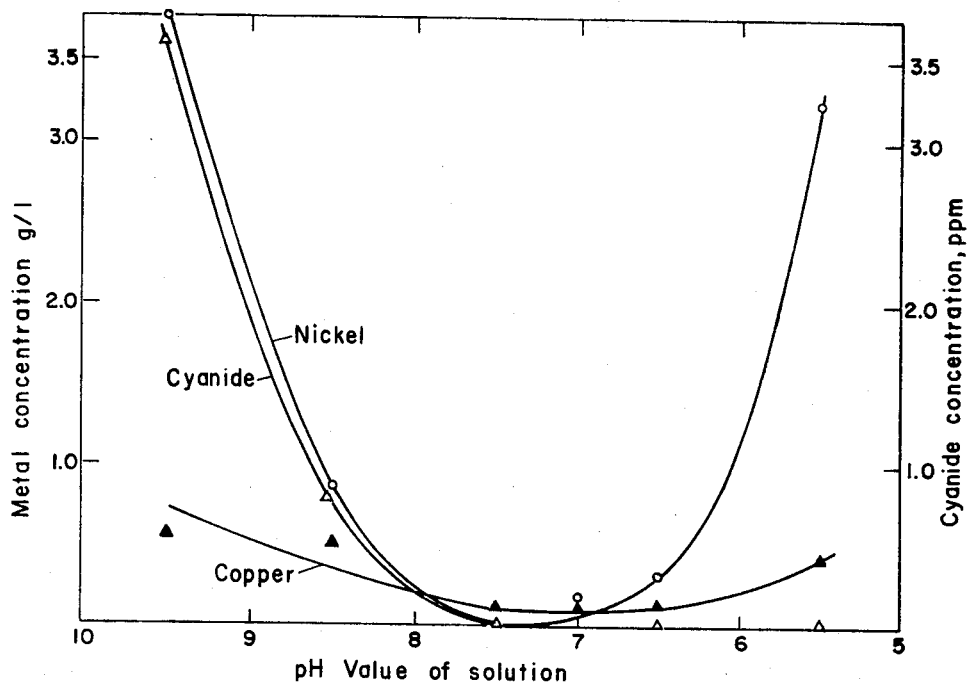
Figure 2:
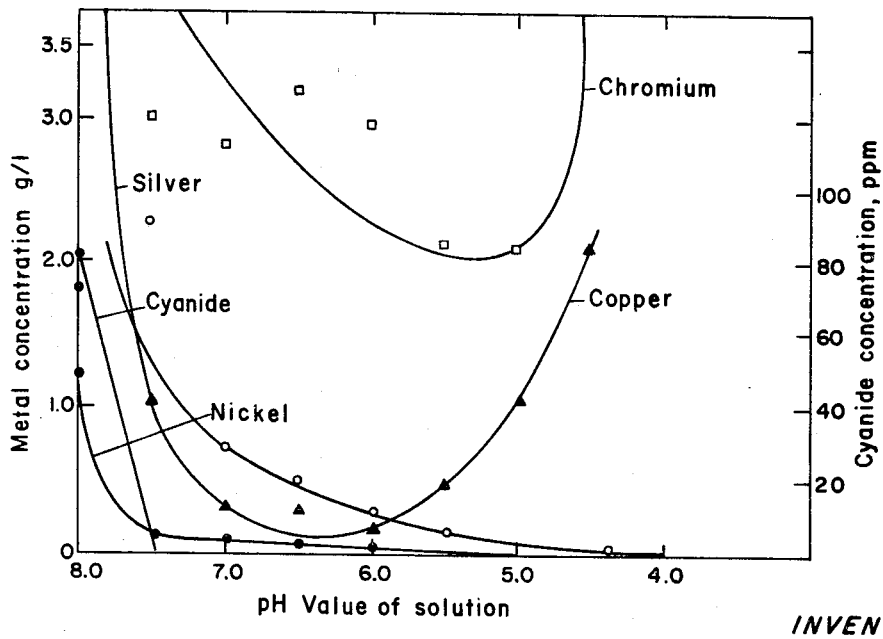

FIGS. 1 and 2 present in graphical form typical results achieved by use of our waste treating process. The figures will be discussed in detail in connection with the examples illustrating specific embodiments of our invention.

Substantial volumes of metal-containing wastes are generated by industrial processes. Typical of such processes are electroplating, chemical etching and pickling. The electroplating industry in particular generates large quantities of metal-containing wastes which require treatment prior to safe disposal. These wastes in general fall into two classes; acidic metal-containing wastes and alkaline wastes containing both metals and cyanide in solution.

Electroplating is carried out using baths of two general types; acid and cyanide. Copper, for example, is often plated from a cyanide bath while nickel plating and chrome anodizing are usually carried out in an acid bath. When small articles are electroplated, they are supported on racks. During the plating operation, metal is also deposited on the racks and this built-up metal must be periodically removed. Metal removal is accomplished using rack stripping solutions which may comprise either an acid or a cyanide solution. For safety reasons, acid solutions are usually used to strip racks from an acid plating bath while cyanide solutions are usually employed to strip racks from a cyanide bath.

Hot, concentrated nitric acid is often used to strip racks from an acid plating bath. The nitric acid is used until it will not dissolve any more metal and is then cooled. Upon cooling, a quantity of precipitate appears which typically comprises nickel nitrate plus some iron and copper nitrates. This leaves a liquid waste stream which comprises a nitric acid solution saturated with metal salts. It is necessary to neutralize the acid and remove the metals from solution prior to disposal of the waste.

Cyanide base rack stripping solutions present even more difficult disposal problems. These stripping solutions generally are composed of an inorganic cyanide salt, such as sodium or potassium cyanide, formulated with sequestering or solubilizing agents such as sodium-metanitrobenzenesulfonates. Spent rack stripping solutions of this type typically will have a cyanide concentration in the general range of about 1 to about 4 molar or from about 26,000 to about 104,000 p.p.m. Additionally, the spent solution contains dissolved metals in a concentration ranging from about 10 to about 50 g./l.

Other electroplating wastes consist of spent or poisoned plating baths and rinse solutions. Bath wastes are similar in character and composition to the rack stripping wastes while rinse solutions are comparatively dilute. Metals commonly contained in the wastes include nickel, chromium, copper, iron and silver.

In its broadest aspect, our invention comprises a technique for utilizing one metal-containing waste to treat another metal-containing waste resulting in precipitation and recovery of most of the metals contained in both waste streams. In addition, the metal-depleted solution resulting from our process may in some cases be of such quality that it may be discharged directly into surface waters.

One of the waste solutions must be alkaline and contain cyanide as well as dissolved metals while the other waste must be acid and also contain dissolved metals. In general, our process is applicable to all wastes falling in the above categories provided that a substantial amount of the dissolved metals present form water insoluble compounds with cyanide ion. Principal waste solutions under consideration for use in our process comprise relatively concentrated wastes derived from electroplating processes. Dissolved metals which are precipitated and recovered by use of our process include those commonly used in electroplating. Our process is specifically applicable for recovery of the following dissolved metals; copper, nickel, chromium, iron and silver. Wastes derived from other sources, such as from pickling or etching processes, are also amenable to treatment using our process as are more dilute wastes such as rinse solutions.

In specific form, our process comprises the slow addition of an acid, metal-containing liquid waste stream to an alkaline, cyanide and metal-containing liquid waste stream. This order of addition is critical in order to avoid the formation of hydrogen cyanide. It is also important that the mixing of the two streams be accomplished relatively slowly with agitation. The amount of dissolved metal in the two waste streams must be at least equal, and preferably exceed, that amount required to precipitate all of the free cyanide contained in the alkaline stream. Excess dissolved metal is not harmful to the process.

The reaction is best carried out in a vessel equipped with stirring or agitation means and a alkaline scrubber. Any evolved gas is scrubbed with an alkaline solution, such as sodium hydroxide, as a safety precaution to collect any hydrogen cyanide gas that may evolve during mixing and agitation. A batch process is most convenient although it is possible to carry out the process in a continuous manner. It is preferred that pH of the process be closely monitored during the reaction and in no circumstances should the pH be allowed to drop below a value of about 4 to 4.5. In most instances using industrial waste streams, the cyanide ion concentration of the reactant liquid approached zero at a pH of about 6.5 to about 7.5. Minimum dissolved metal concentrations generally occurs at a pH level somewhat below that at which cyanide ion disappears; usually in the pH range of about 7.5 to about 5.5. Cyanide ion concentration may be conveniently monitored by use of a cyanide-sensitive electrode.

Reaction products include a precipitate of metal cyanides and a relatively dilute aqueous solution of metal ions. The precipitate may be recovered by filtration and further processed for recovery of the contained metals. This further processing preferably consists of oxidation to form the corresponding metal oxides. The metal oxides, usually comprising a mixture of metals, may then be digested using a mineral acid such as sulfuric and the metals may then be separated by selective precipitation, electrolysis and similar techniques.

The following examples more fully illustrate specific embodiments of our invention.

EXAMPLE 1

A nitric acid rack stripping waste from an electroplating operation was used to neutralize an alkaline, cyanide-containing rack stripping waste from another plating operation. The nitric acid waste contained large amounts of dissolved nickel and copper together with smaller amounts of iron and cobalt. Metals contained in the cyanide waste included nickel, copper and iron.

Nitric acid waste was added slowly with stirring to the cyanide waste. Samples of the resulting solution were periodically collected for analysis and acid waste addition was continued until the pH reached about 4.5. It is important to note that this procedure would be extremely hazardous if the order of addition were reversed (if cyanide waste were added to acid waste) or if too much acid waste were added to an alkaline waste having an unusually high cyanide content. In either case, hydrogen cyanide gas would be evolved.

During the neutralization procedure, all evolved gases were collected and scrubbed using a 0.1 molar sodium hydroxide solution, as a safety precaution, to recover any hydrogen cyanide produced. After the reaction was completed, the sodium hydroxide solution was analyzed for cyanide ion. No cyanides were detected and the detection limit for the analytical technique used (cyanide sensitive electrode) was 0.08 p.p.m.

Samples of the supernatant solution collected during the course of the reaction were analyzed and the results of these analyses are presented graphically as FIG. 1.

Nearly all of the original free cyanide content of the waste stream had been precipitated at a pH of 9 and cyanide was not detected at pH levels below about 7.5. Again, the detection limit for cyanide was 0.08 p.p.m. Almost quantitative precipitation of the metals contained in the waste streams occurred at a pH within the range of about 7–7.5 as is shown in the figure. Since the supply of precipitating cyanide ion was exhausted at this pH level, further additions of acid waste simply introduced excess acid and metal ion into the solution.

The precipitated metal cyanides were removed from the reaction medium and were analyzed. A combination of X-ray diffraction analysis, chemical analysis and differential thermal analysis revealed that the precipitate comprised CuCN, $Ni(CN)_2 \cdot 4H_2O$ and

$$Cu_2Fe(CN)_6 \cdot 7H_2O$$

The mixed precipitate analyzed 24.0% nickel, 23.6% copper and 0.9% iron.

EXAMPLE 2

A spent chromic acid solution, which had been used to etch printed circuits, was used to neutralize an alkaline, cyanide-containing rack stripping waste from a silver electroplating operation. Beside chromium, the chromic acid waste contained a high concentration (about 52–57 g./l.) of copper and small amounts of iron and nickel. The cyanide waste contained silver, some copper and small amounts of iron and nickel.

As in Example 1, the acid waste was added slowly with stirring to the cyanide waste. Evolved gases were scrubbed with sodium hydroxide solution but there was no evidence of hydrogen cyanide evolution during the reaction. Samples of the supernatant solution were periodically collected and analyzed. Results of the analyses are presented graphically as FIG. 2. As may be seen from the figure, free cyanide ion concentration approached zero at a pH of about 7.5 and metal ion concentration reached a minimum at a pH of about 6 or slightly below. While the removal of chromium was not as complete as that of the other metal ions, nevertheless approximately 96% of the chromium originally present in the two solutions was precipitated.

EXAMPLE 3

Another sample of alkaline, rack stripping waste contained 18.96 g./l. copper, 14.64 g./l. iron, 5.14 g./l. nickel and 89.70 g./l. cyanide Twenty-two liters of this waste was neutralized by addition of 7.5 l. of a nitric acid rack stripping waste. The nitric acid waste contained 62.88 g./l. copper, 2.84 g./l. iron and 108.61 g./l. nickel. At the conclusion of the reaction, there was recovered by filtration a metal cyanide precipitate weighing 4180 g. No evolution of hydrogen cyanide gas occurred during the reaction and the free cyanide ion concentration in the filtrate was less than 0.08 p.p.m.

EXAMPLE 4

The metal cyanide precipitate recovered from the reaction of Example 1 was heated in air to about 250° C. At about this temperature, the mixed cyanides ignite and undergo a self-sustained oxidation during which temperatures within the reaction mass may rise far above the furnace temperature. Conversion of the metal cyanides to their respective oxides was essentially complete at the end of the reaction. Products obtained were identified by X-ray diffraction as NiO, CuO and FeO.

Next, the mixed metal oxides were digested for 2 hours at 100° C. with 10% sulfuric acid resulting in about 95% conversion of the oxides to sulfates. The sulfates were dissolved in water and sufficient lime was added to adjust the pH of the solution to about 2.3–2.7 which caused the precipitation of ferric hydroxide. Copper was then recovered almost quantatively by controlled potential electrolysis at 0.1 to 0.3 volt. The recovered copper was highly pure; spectrographic analysis revealed only a trace amount of silicon. The remaining nickel sulfate solution was found to be sufficiently pure for direct recycling to a plating bath.

While neutralization of specific liquid waste streams has been illustrated by the examples, it will be appreciated that the source of the waste is immaterial. For example, a waste pickle liquor stream containing acid and dissolved iron could be used to treat a cyanide-containing leach liquor such as is used in the extractive metallurgy of gold.

We claim:

1. A process for treating alkaline waste streams containing cyanide and dissolved metals which comprises:
    slowly adding to the alkaline stream a second waste stream containing dissolved metals and having a pH below 4.5;
    the metals contained in both the alkaline and the acid waste streams comprising those metals which form water insoluble metal cyanides, said dissolved metals contained in the two waste streams being present in amounts exceeding that amount required to precipitate all of the cyanide contained in the alkaline stream;
    ending addition of the waste acid stream to the waste alkaline stream at a point where the pH of the merged streams is below about 7.5 and above about 4.5, and
    recovering from the merged streams a metal cyanide precipitate without the generation of detectable quantities of hydrogen cyanide.

2. The process of claim 1 wherein the alkaline waste stream is continuously agitated during addition of the second waste stream.

3. The process of claim 2 wherein the metals contained in the two streams are chosen from the group consisting of copper, nickel, chromium, iron, silver and mixtures thereof.

4. The process of claim 4 wherein addition of the second waste stream to the waste alkaline stream is ended at a point wherein the pH of the merged streams is below about 7.5 and above 5.5.

5. The process of claim 4 wherein the recovered metal cyanide precipitate is oxidized to form the corresponding metal oxides.

6. The process of claim 5 wherein the metals are copper, nickel and iron and wherein the metal oxides are dissolved in a mineral acid.

7. The process of claim 6 wherein iron is selectively removed from the mineral acid solution of metal oxides by precipitation at a pH in the range of about 2.3 to about 2.7.

8. The process of claim 7 wherein copper is removed from solution by controlled potential electrolysis.

9. The process of claim 8 wherein the mineral acid is sulfuric and wherein the remaining nickel sulfate is recycled to an electroplating process.

10. The process of claim 4 wherein the alkaline waste stream has a total cyanide concentration in the range of 1 to 4 molar and contains dissolved metals in a concentration ranging from 10 to 50 grams per liter.

References Cited

UNITED STATES PATENTS

| 722,455 | 3/1903 | Prister | 75—106 |

FOREIGN PATENTS

| 416,475 | 9/1934 | Great Britain | 75—106 |

OTHER REFERENCES

Textbook of Quantitative Inorganic Analysis by Kolthoff et al., 1947, pp. 423–427.

"Handbook of Chemistry and Physics," 32nd Ed., 1950, pp. 506–507.

"Chemistry of Cyanidation," Mineral Dressing Notes, No. 23, Amer. Cyanamid Co.

"The Treatment of Industrial Wastes," E. B. Besselievre, McGraw-Hill, N.Y., 1969, pp. 176–177.

"Disposal of Cyanides by Complexation" by D. Milne, Sewage and Industrial Wastes, vol. 22, No. 9, 1950, pp. 1192–1199.

"Disposal of Plating Room Wastes" by Dodge et al. Plating, October 1952, pp. 1133–1139.

"Disposal of Plating Room Wastes" by Dodge et al. Plating, November 1952, pp. 1235–1241.

"Cyanide Disposal Methods" by L. Serota, Metal Finishing, October 1957, pp. 75–77.

"Acidification of Cyanide Waste" by L. Serota, Metal Finishing, November 1957, pp. 72–75.

JOHN H. MACK, Primary Examiner

R. L. ANDREWS, Assistant Examiner

U.S. Cl. X.R.

423—43, 53, 142, 143, 367, 371, 594, 604, 607; 210—45

UNITED STATES PATENT OFFICE
CERTIFICATE OF CORRECTION

PATENT NO. : 3,736,239
DATED : May 29, 1973
INVENTOR(S) : Lawrence C. George, Lee N. Ballard, Vernon N. Feeler It is certified that error appears in the above-identified patent and that said Letters Patent are hereby corrected as shown below:

In the claims:

Claim 4, line 1; Change the dependency of this claim from "4" to --3--.

Signed and sealed this 27th day of May 1975.

(SEAL)
Attest:

RUTH C. MASON
Attesting Officer

C. MARSHALL DANN
Commissioner of Patents
and Trademarks